United States Patent
Lee

(10) Patent No.: US 9,363,354 B2
(45) Date of Patent: Jun. 7, 2016

(54) APPARATUS AND METHOD FOR CONNECTING DEVICE THROUGH IMAGE RECOGNITION IN MOBILE TERMINAL

(75) Inventor: Yun-Woo Lee, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 520 days.

(21) Appl. No.: 12/861,189

(22) Filed: Aug. 23, 2010

(65) Prior Publication Data

US 2011/0052072 A1 Mar. 3, 2011

(30) Foreign Application Priority Data

Aug. 28, 2009 (KR) .................. 10-2009-0080400

(51) Int. Cl.
| | | |
|---|---|---|
| *H04M 1/72* | (2006.01) | |
| *H04N 21/41* | (2011.01) | |
| *H04M 1/725* | (2006.01) | |
| *H04N 21/4223* | (2011.01) | |
| *H04N 21/44* | (2011.01) | |
| *H04N 21/442* | (2011.01) | |

(52) U.S. Cl.
CPC ......... *H04M 1/7253* (2013.01); *H04N 21/4126* (2013.01); *H04N 21/4223* (2013.01); *H04N 21/44008* (2013.01); *H04N 21/44227* (2013.01); *H04M 2250/52* (2013.01)

(58) Field of Classification Search
CPC .......... H04M 1/72527; H04M 1/7253; H04M 1/72533; H04N 21/4104; H04N 21/4126; H04N 21/4223; G08C 2201/93
See application file for complete search history.

(56) References Cited

U.S. PATENT DOCUMENTS

| | | | |
|---|---|---|---|
| 6,342,903 B1* | 1/2002 | Fado et al. ................ | 715/716 |
| 7,222,359 B2* | 5/2007 | Freund et al. ................ | 726/3 |
| 7,224,903 B2* | 5/2007 | Colmenarez et al. ......... | 398/106 |
| 8,116,685 B2* | 2/2012 | Bregman-Amitai et al. | 455/41.2 |
| 2003/0050009 A1* | 3/2003 | Kurisko et al. ................ | 455/41 |
| 2004/0192206 A1* | 9/2004 | Hirvonen ................ | 455/41.2 |
| 2004/0222983 A1* | 11/2004 | Kakemura ................ | 345/204 |
| 2005/0120096 A1* | 6/2005 | Rekimoto et al. ........... | 709/220 |
| 2006/0135064 A1 | 6/2006 | Cho et al. | |
| 2007/0017349 A1* | 1/2007 | Uehara ................ | 84/609 |
| 2007/0123166 A1* | 5/2007 | Sheynman et al. ......... | 455/41.2 |
| 2007/0236327 A1* | 10/2007 | Miyashita ............. | G05B 15/02 |
| | | | 340/3.71 |

(Continued)

FOREIGN PATENT DOCUMENTS

| | | | | |
|---|---|---|---|---|
| KR | 10-2006-0054883 A | 5/2006 | ............... | H04B 7/24 |
| KR | 10-0651533 B1 | 11/2006 | ............. | H04L 12/28 |
| KR | 10-2009-0002848 | 1/2009 | | |
| KR | 10-2009-0002848 A | 1/2009 | ............. | H04W 8/20 |

OTHER PUBLICATIONS

Scott et al. (Jan. 2005) "Using visual tags to bypass Bluetooth device discovery." ACM SIGMOBILE Mobile Computing and Communications Review, vol. 9 No. 1, pp. 41-53.*

(Continued)

*Primary Examiner* — Andrew W Johns

(74) *Attorney, Agent, or Firm* — Jefferson IP Law, LLP

(57) ABSTRACT

An apparatus and a method for reading an image in a mobile terminal to establish a connection with a neighbor apparatus corresponding to the read image are provided. The apparatus includes an apparatus connector. The apparatus connector determines a neighbor apparatus to which a user desires to connect by reading a corresponding image, and establishes a connection with the determined neighbor apparatus.

16 Claims, 5 Drawing Sheets

(56) References Cited

U.S. PATENT DOCUMENTS

| | | | |
|---|---|---|---|
| 2007/0238491 A1* | 10/2007 | He | 455/569.2 |
| 2008/0057890 A1* | 3/2008 | McKillop et al. | 455/185.1 |
| 2008/0139116 A1* | 6/2008 | Balgard et al. | 455/41.2 |
| 2009/0011707 A1 | 1/2009 | Ko et al. | |
| 2009/0156123 A1* | 6/2009 | Kim | 455/41.2 |
| 2010/0261465 A1* | 10/2010 | Rhoads et al. | 455/420 |
| 2010/0317332 A1* | 12/2010 | Bathiche et al. | 455/418 |
| 2012/0019674 A1* | 1/2012 | Ohnishi et al. | 348/207.1 |
| 2015/0042460 A1* | 2/2015 | Mui | 340/12.31 |

OTHER PUBLICATIONS

Saxena, N. (May 2006) "Secure device pairing based on a visual channel." 2006 IEEE Symp. on Security and Privacy, pp. 313-318.*

McCune, J.M. (May 2005) "Seeing-is-Believing: Using camera phones for human-verifiable authentication." MS Thesis, Carnegie Mellon University.*

Bluetooth SIG (Nov. 2004). "Bluetooth Specification Version 2.0 + EDR." vol. 0.*

* cited by examiner (CONNENTIONAL ART)

though spaces between pages.

APPARATUS AND METHOD FOR CONNECTING DEVICE THROUGH IMAGE RECOGNITION IN MOBILE TERMINAL

PRIORITY

This application claims the benefit under 35 U.S.C. §119 (a) of a Korean patent application filed in the Korean Intellectual Property Office on Aug. 28, 2009 and assigned Serial No. 10-2009-0080400, the entire disclosure of which is hereby incorporated by reference.

BACKGROUND OF THE INVENTION

1. Field of the Invention

The present invention relates to an apparatus and a method for short distance communication in a mobile terminal. More particularly, the present invention relates to an apparatus and a method for reading an image in a mobile terminal to communicate with a neighbor apparatus corresponding to the image.

2. Description of the Related Art

Use of mobile terminals has rapidly increased since the mobile terminals provide a wide variety of services and convenience in portability. Therefore, service providers (i.e., terminal manufacturers) have competitively developed terminals having even more convenient functions in order to attract more users.

For example, mobile terminals now provide functions such as a phonebook, games, a scheduler, a Short Message Service (SMS), a Multimedia Message Service (MMS), a broadcast message service, an Internet service, an Electronic (E)-mail, a morning call, a Motion Picture Expert Group Audio Layer-3 (MP3) player, a digital camera, and the like.

Additionally, mobile terminals now provide and support various services such as use of a headset, playing of music, printing and transmitting files, and the like through a Bluetooth function, which is a technique for communication between terminals existing at a short distance.

To use a Bluetooth function, a mobile terminal first searches for neighboring devices that also support the Bluetooth function. After the neighboring devices are found, the mobile terminal performs a pairing process by determining whether communication with any of the neighboring Bluetooth devices is possible in order to establish a communication state. That is, to use the Bluetooth function, the mobile terminal first searches for neighboring devices that also support the Bluetooth function, generates a list of the Bluetooth available devices, and then selects a Bluetooth device for connection.

As described above, the mobile terminal selects a Bluetooth device from the list of neighboring connectable Bluetooth devices, and communicates with the selected Bluetooth device to perform a service corresponding to the Bluetooth device.

However, according to the above-described method, a user must search for Bluetooth devices and select a Bluetooth device to be connected whenever the user desires to use a service. Also, the user of the mobile terminal must view the various model names of the Bluetooth devices in order to select and connect to a relevant Bluetooth device. Therefore, a user who is not accustomed to the model names may be inconvenienced when connecting to the relevant device.

Additionally, when the mobile terminal performs the process of searching for neighboring Bluetooth devices, the mobile terminal consumes power.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for intuitively determining information regarding a neighbor apparatus to be connected in a mobile terminal Another aspect of the present invention is to provide an apparatus and a method for reading an image to determine a corresponding neighbor apparatus to be connected in a mobile terminal.

Still another aspect of the present invention is to provide an apparatus and a method for reducing a process of searching for a neighbor apparatus during communication with the neighbor apparatus in a mobile terminal.

In accordance with an aspect of the present invention, an apparatus for establishing a connection through image recognition in a mobile terminal is provided. The apparatus includes an apparatus connector for determining a neighbor apparatus to which a user desires to connect by reading a corresponding image, and for establishing a connection with the determined neighbor apparatus.

In accordance with another aspect of the present invention, a method for establishing a connection through image recognition in a mobile terminal is provided. The method includes determining a neighbor apparatus on which a user desires to perform short distance communication by reading a corresponding image, and establishing a connection with the determined neighbor apparatus.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide an apparatus and a method for reducing a process of searching for a neighbor apparatus, reading an image to determine a corresponding neighbor apparatus to be connected, and intuitively providing information regarding the neighbor apparatus during communication with the neighbor apparatus. In addition, the mobile terminal may perform communication with a neighbor apparatus using a short distance communication method such as Bluetooth communication, Infrared communication, PictBridge, and the like.

Figure 1:
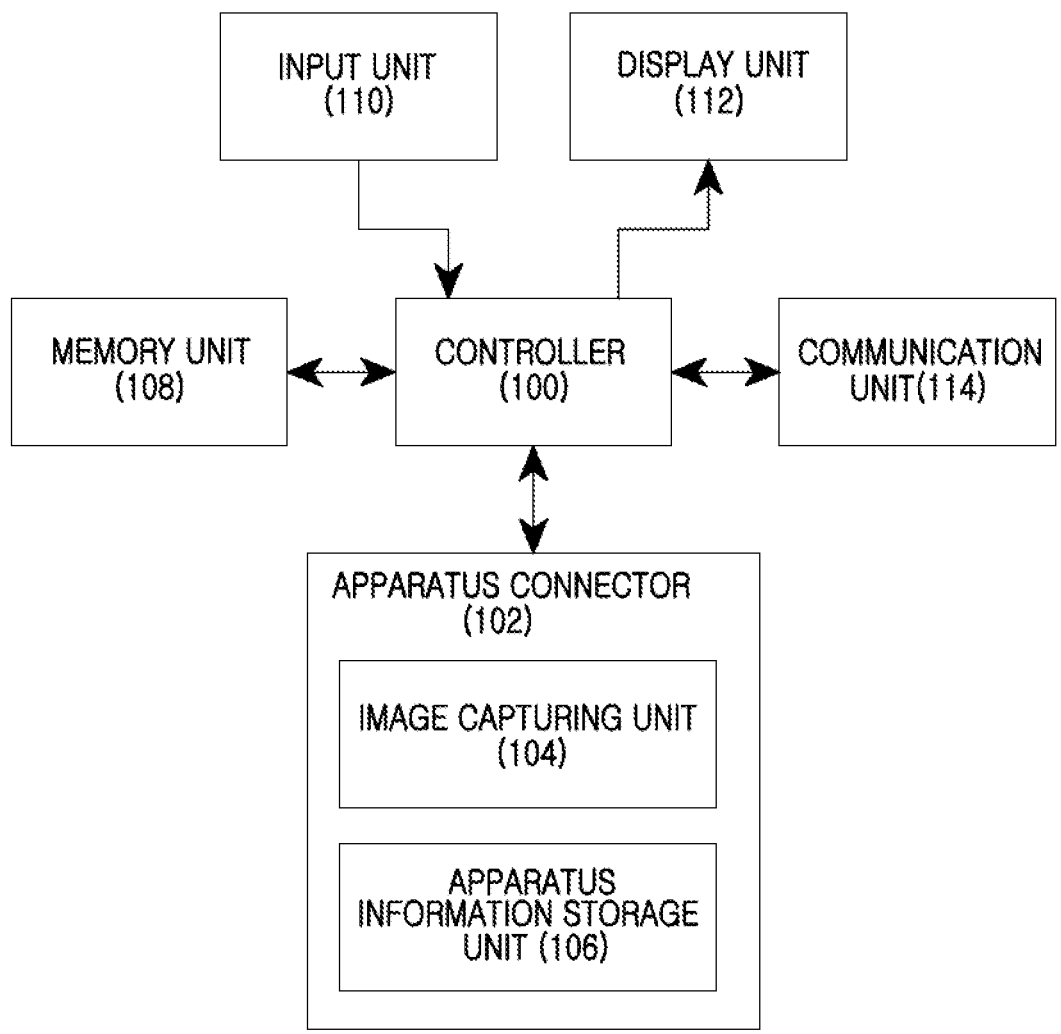
FIG. 1 is a block diagram illustrating a mobile terminal for establishing a communication connection with a neighbor apparatus using an image according to an exemplary embodiment of the present invention.

FIG. 1 is a block diagram illustrating a mobile terminal for establishing a communication connection with a neighbor apparatus using an image according to an exemplary embodiment of the present invention.

Referring to FIG. 1, the mobile terminal includes a controller 100, an apparatus connector 102, a memory unit 108, an input unit 110, a display unit 112, and a communication unit 114. The apparatus connector 102 may include an image capturing unit 104 and an apparatus information storage unit 106. The portable terminal may include additional units that are not illustrated here merely for sake of clarity. Similarly, the functionality of two or more of the above units may be integrated into a single component.

The controller 100 of the mobile terminal controls an overall operation of the mobile terminal. For example, the controller 100 controls a process for voice communication and data communication. In addition to the general operations, according to an exemplary embodiment of the present invention, the controller 100 reads an image of an apparatus to intuitively provide information regarding the apparatus for connection using short distance communication. Additionally, according to an exemplary embodiment of the present invention, the controller 100 reduces power consumption of the mobile terminal by omitting a process of searching for the neighbor apparatus when using short distance communication.

To perform the above operations, the controller 100 controls the apparatus connector 102 to obtain an image of a neighbor apparatus to which a user desires to connect. The controller 100 also controls connection with the relevant neighbor apparatus using information corresponding to the obtained image.

According to an exemplary implementation, the apparatus connector 102 determines the type of neighbor apparatus to which the user desires to connect by capturing an image or reading a stored image under control of the controller 100.

Additionally, the apparatus connector 102 obtains information corresponding to the determined neighbor apparatus under control of the controller 100 to establish a communication connection with the neighbor apparatus.

The image capturing unit 104 of the apparatus connector 102 includes a camera. Using the camera, the image capturing unit 104 obtains an image of the neighbor apparatus to which the user desires to connect. The apparatus information storage unit 106 stores information required for communication corresponding to a plurality of neighbor apparatuses. The apparatus information storage unit 106 may be included in the memory unit 108.

The memory unit 108 includes, for example, Read Only Memory (ROM), Random Access Memory (RAM), flash ROM, and the like. The ROM stores microcode (i.e., code) of programs for processes and controls of the controller 100 and the apparatus connecting unit 102, and various reference data.

The RAM serves as a working memory of the controller 100 and stores temporary data occurring during execution of various programs. The flash ROM stores various updatable data for storage such as information of a phonebook, calling messages, received messages, and a user's touch input point.

The input unit 110 includes a plurality of function keys such as numerical key buttons of 0 to 9, a menu button, a cancel button, an OK button, a TALK button, an END button, an Internet access button, navigation key buttons, letter input keys, and the like. The input unit 110 provides key input data corresponding to a key pressed by a user to the controller 100. These keys are merely examples of keys which may make up the input unit 110. That is, the input unit may include additional or different keys, or different input mechanisms through which the user supplies input to the portable terminal.

The display unit 112 displays status information generated during an operation of the mobile terminal, a limited number of letters, a large amount of moving images, still images, and the like. The display unit 112 may be a color Liquid Crystal Display (LCD), an Active Mode Organic Light Emitting Diode (AMOLED), and the like. The display unit 112 may include a touch input device. When the display unit 112 having the touch input device is applied to a touch input type mobile terminal, the display unit 112 may serve as an input unit.

The communication unit 114 transmits/receives a Radio Frequency (RF) signal of data input/output via an antenna (not illustrated). For example, during transmission, the communication unit 114 channel-codes and spreads data to be transmitted, and then performs an RF process on the signal to transmit the signal. During reception, the communication unit 114 converts a received RF signal into a baseband signal, and despreads and channel-decodes the baseband signal to recover data.

The functions of the apparatus connector 102 may be performed by the controller 100 of the mobile terminal. Separate configuration and illustration of the apparatus connector 102 are for exemplary purpose only and for convenience in description, and are not to be construed as limiting the scope of the present invention. It would be obvious to those skilled in the art that various modifications may be made within the scope of the present invention. For example, all of the functions of the apparatus connector 102 may be processed by the controller 100.

An exemplary apparatus for reducing a process of searching for a neighbor apparatus, and intuitively providing information regarding the neighbor apparatus to be connected during communication with the neighbor apparatus in a mobile terminal has been described above. An exemplary method for intuitively providing information regarding a neighbor apparatus by reading a corresponding image is described below.

Figure 2:
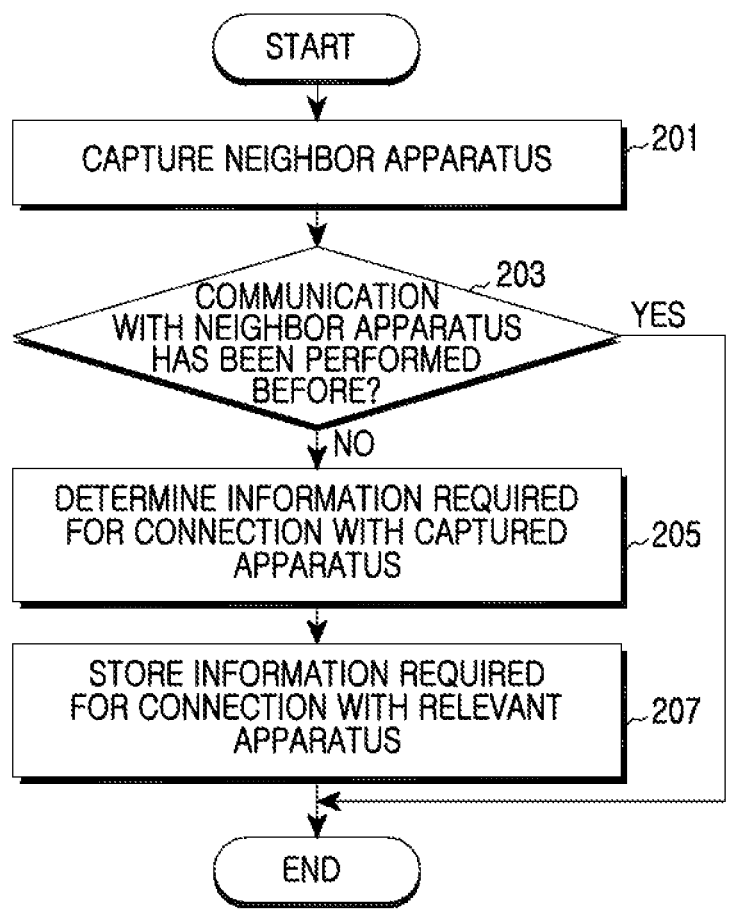
FIG. 2 is a flowchart illustrating a process for storing information required for establishing a communication connection with a neighbor apparatus in a mobile terminal according to an exemplary embodiment of the present invention.

FIG. 2 is a flowchart illustrating a process for storing information required for establishing a communication connection with a neighbor apparatus in a mobile terminal according to an exemplary embodiment of the present invention.

Referring to FIG. 2, the mobile terminal captures an image of a neighbor apparatus and determines the captured apparatus in step 201.

The mobile terminal determines whether communication with the determined apparatus has been performed before in step 203.

If it is determined in step 203 that communication with the neighbor apparatus has been performed before, the mobile terminal assumes that information required for communication with the relevant neighbor apparatus has been stored and does not store separate information. The mobile terminal then ends the present algorithm.

In contrast, if it is determined in step 203 that communication with the neighbor apparatus has not been performed before, the mobile terminal determines information required to establish a communication connection with the captured apparatus in step 205, and stores the determined information in step 207.

The information required to establish a communication connection with the captured apparatus may be a model name, an ID, a connection address, and the like. The mobile terminal may directly input the information of the apparatus to be connected, or omit a process of inputting the relevant information every time by storing the relevant information during initial communication.

After that, the mobile terminal ends the present algorithm.

Figure 3:
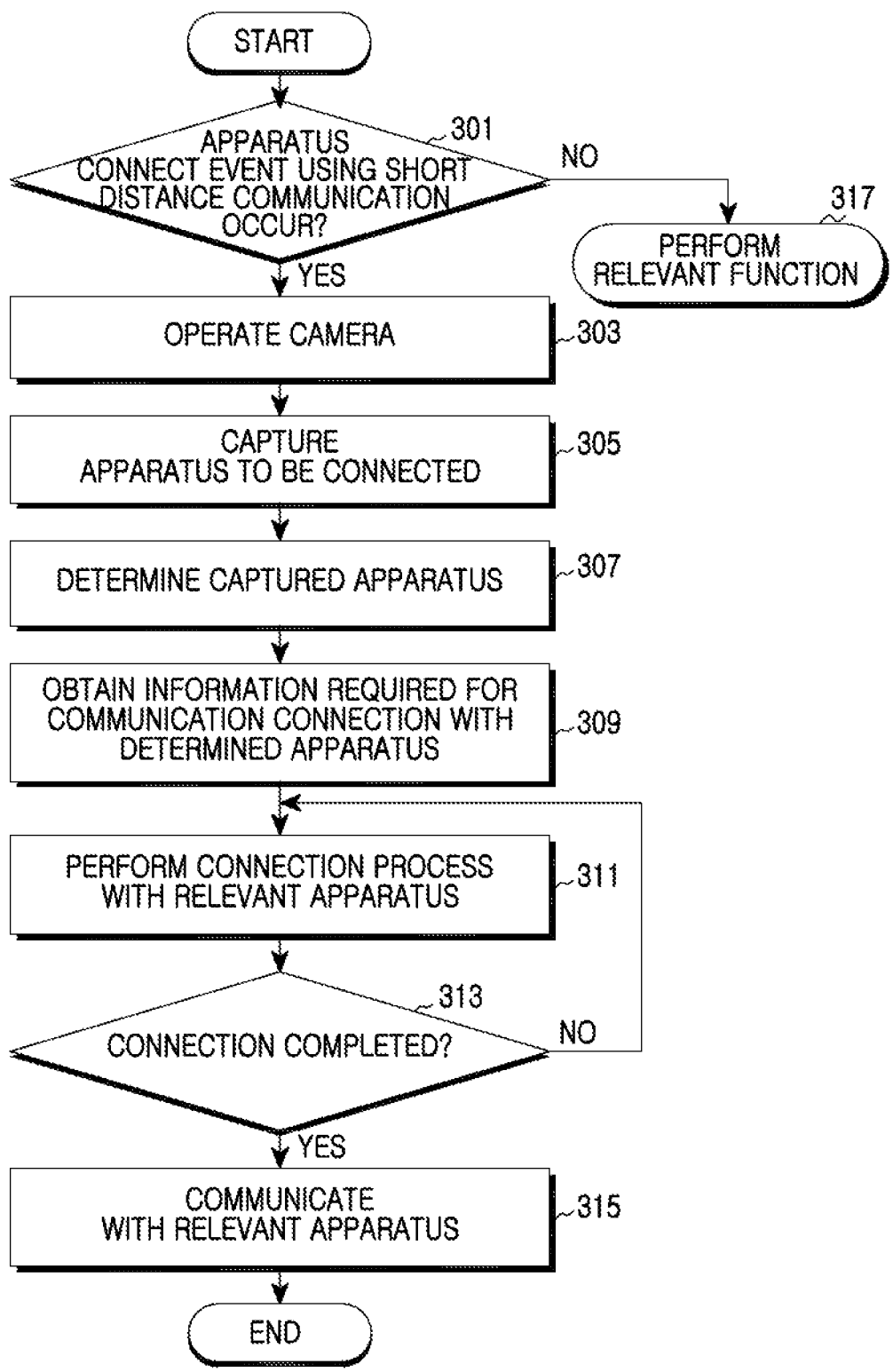
FIG. 3 is a flowchart illustrating a process for establishing a communication connection with a neighbor apparatus in a mobile terminal according to an exemplary embodiment of the present invention.

FIG. 3 is a flowchart illustrating a process for establishing a communication connection with a neighbor apparatus in a mobile terminal according to an exemplary embodiment of the present invention.

Referring to FIG. 3, the mobile terminal determines whether an event for connection with a neighbor apparatus occurs in step 301. Here, the event for connection with the neighbor apparatus denotes an event for communication with an existing neighbor apparatus using short distance communication.

If it is determined in step 301 that the event for connection with the neighbor apparatus does not occur, the mobile terminal performs a relevant function (e.g., a standby mode) in step 317.

In contrast, if it is determined in step 301 that the event for connection with the neighbor apparatus occurs, the mobile terminal operates a camera that can capture an image in step 303, and captures an image of the neighbor apparatus to be connected in step 305. Here, according to an exemplary embodiment of the present invention, instead of searching for an apparatus existing in the neighborhood, the mobile terminal captures an image of the apparatus to be connected using the image of the apparatus. In addition, as described above, the mobile terminal may load an image already stored in the mobile terminal to obtain the image of the apparatus without capturing an image.

The mobile terminal determines the apparatus captured by the user of the mobile terminal, that is, the type of the apparatus with which the user desires to communicate using the image (captured in step 305) in step 307, and obtains information required to establish a communication connection with the apparatus (determined in step 307) in step 309. Here, the information required for the communication connection may be a model name, an ID, a connection address, and the like of the apparatus to be connected. The mobile terminal may store information used for communication connection with the relevant neighbor apparatus during initial communication with the relevant neighbor apparatus, or store information input by the user. Accordingly, the mobile terminal obtains information regarding the apparatus corresponding to the captured image from the information stored in advance.

The mobile terminal performs a communication connection process with the relevant apparatus using the information (obtained in step 309) in step 311.

In step 313, the mobile terminal determines whether the connection with the apparatus is completed.

If it is determined in step 313 that the connection has not been completed, the mobile terminal re-performs the connection process with the relevant neighbor apparatus using the information (obtained in step 309) in step 311.

In contrast, if it is determined in step 313 that the connection has been completed, the mobile terminal performs communication with the relevant neighbor apparatus in step 315, and ends the present algorithm.

Though an exemplary method that allows the user of the mobile terminal to determine a neighbor apparatus to be connected using a captured image has been described with reference to FIG. 3, the user may determine a neighbor apparatus to be connected using a stored image rather than a captured image according to an exemplary embodiment of the present invention.

Figure 4A:
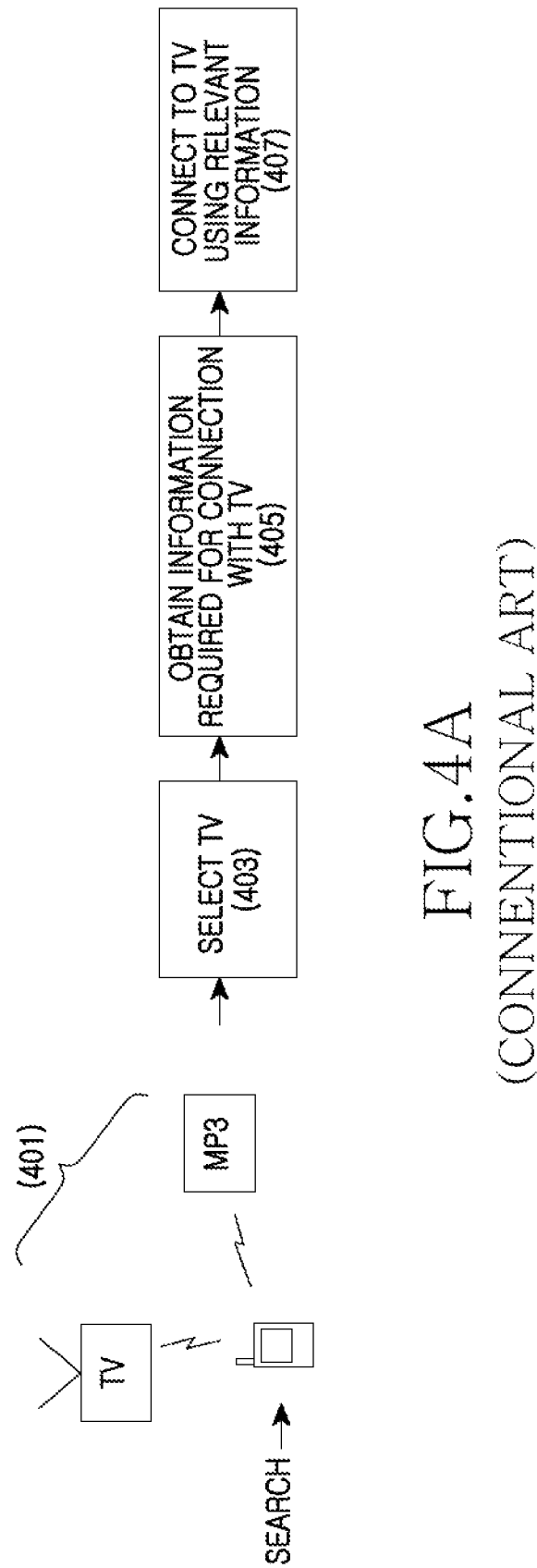
FIG. 4A is a view illustrating a process for establishing a communication connection with a neighbor apparatus in a conventional mobile terminal.
Figure 4B:
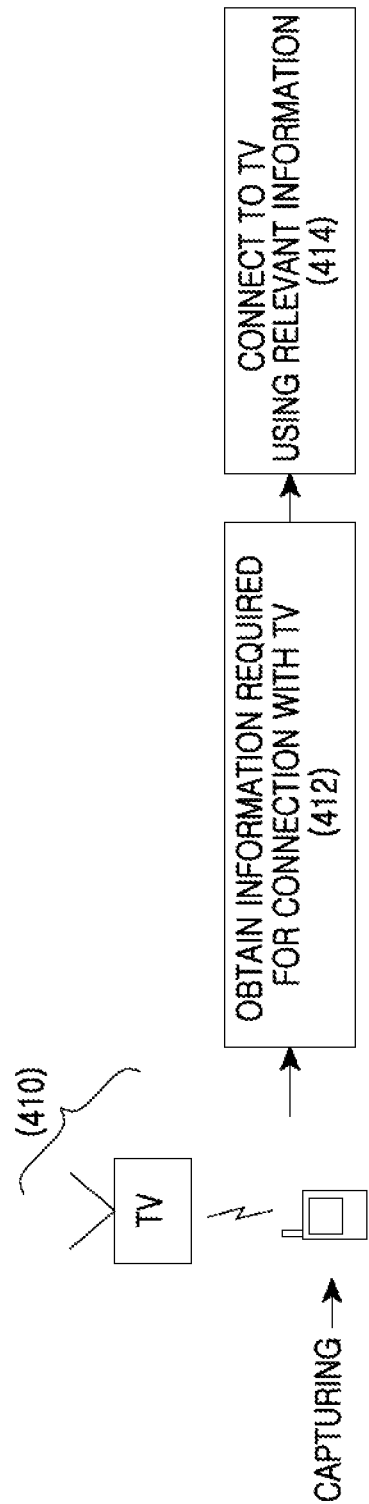
FIG. 4B is view illustrating a process for establishing a communication connection with a neighbor apparatus in a mobile terminal according to an exemplary embodiment of the present invention.

FIGS. 4A and 4B are views comparing processes of establishing a communication connection with a neighbor apparatus in a conventional mobile terminal and a mobile terminal according to an exemplary embodiment of the present invention.

FIG. 4A is a view illustrating a process for establishing a communication connection with a neighbor apparatus in a conventional mobile terminal.

Referring to FIG. 4A, the mobile terminal performs a search process to determine neighboring apparatuses with which the mobile terminal may connect and perform communication in step 401.

In the example of FIG. 4A, the mobile terminal that has performed the above-described searching process determines that a television and a Motion Picture Expert Group Audio Layer-3 (MP3) player exist in the neighborhood using information received from each of the neighbor apparatuses.

After that, the mobile terminal allows a user to select a neighbor apparatus for connection. For example, assuming that the user selects the television in step 403 as an apparatus with which the user desires to communicate, the mobile terminal communicates with the television to obtain information required for the connection in step 405, and then connects with the television using the obtained information in step 407.

FIG. 4B is view illustrating a process for establishing a communication connection with a neighbor apparatus in a mobile terminal according to an exemplary embodiment of the present invention.

Referring to FIG. 4B, the mobile terminal does not perform the search process that was performed by the conventional mobile terminal, that is, a process of determining apparatuses existing in the neighborhood.

Instead, according to an exemplary embodiment of the present invention, the mobile terminal determines a neighbor apparatus with which the user desires to communicate using an image, and establishes a communication connection using information stored in advance.

In the example of FIG. 4B, the mobile terminal desires to communicate with the neighboring television. To establish the communication connection with the television, the mobile terminal captures an image of the television in step 410. In an exemplary implementation, the mobile terminal may capture and store images of apparatuses existing in the neighborhood in advance. In that case, the mobile terminal does not perform a separate image capturing process each time the user desires to connect to a neighbor apparatus, but instead loads the appropriate image stored in advance.

Having obtained the image in step 410, the mobile terminal reads the image and determines that the apparatus to which the user desires to connect is a television. Therefore, the mobile terminal obtains information required for connection with the television in step 412 and connects with the television using the relevant information in step 414. In an exemplary implementation, the mobile terminal obtains the information required for connection from information stored in advance.

As described above, a mobile terminal according to an exemplary embodiment of the present invention may reduce a process of searching for a neighbor apparatus, and intuitively provide information regarding an apparatus to which a user desires to connect by reading an image of the apparatus. In contrast, the conventional mobile terminal searches for a neighbor apparatus and provides a result thereof as information regarding the relevant model. In addition, a mobile terminal according to an exemplary embodiment of the present invention may prevent a power consumption problem of the mobile terminal by omitting a process of searching for a neighbor apparatus.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for establishing a connection through image recognition, the apparatus comprising:
   a camera unit;
   a display unit;
   a memory unit configured to store images for each of at least two neighbor apparatuses captured by the camera unit and information to be used for connection each of the at least two neighbor apparatuses; and
   a controller configured to:
      in response to establishing a connection with a neighbor apparatus, store an image corresponding the neighbor apparatus captured by the camera unit by mapping information used for connection of the neighbor apparatus to the captured image,
      select an image corresponding to a specific neighbor apparatus to which a user desires to connect among the images stored in the memory unit,
      obtain information used for connection of the specific neighbor apparatus corresponding to the selected image, and
      establish a connection with the specific neighbor apparatus using the obtained information.

2. The apparatus of claim 1, wherein the controller is configured to map the information obtained during initial communication with the captured neighbor apparatus to the captured image.

3. The apparatus of claim 1, wherein the information required for the connection comprises at least one of a model name, an IDentifier (ID) and a connection address of the specific neighbor apparatus.

4. The apparatus of claim 1, wherein the information required for establishing the connection comprises one of information used for initial communication with the specific neighbor apparatus and information regarding the specific neighbor apparatus input by a user.

5. The apparatus of claim 1, wherein the controller determines if communication with the specific neighbor apparatus has been previously performed.

6. The apparatus of claim 5, wherein, if the controller determines that communication with the specific neighbor apparatus has not been previously performed, the controller determines information required for connection with the specific neighbor apparatus and stores the determined information.

7. The apparatus of claim 1, wherein the communication with the specific neighbor apparatus is established using a short distance communication.

8. The apparatus of claim 7, wherein the short distance communication comprises a peer-to-peer connection.

9. A method for establishing a connection through image recognition in a mobile terminal, the method comprising:
   in response to establishing a connection with a neighbor apparatus, storing images for each of at least two neighbor apparatuses captured by a camera unit of the mobile terminal and information to be used for connection each of the at least two neighbor apparatuses by mapping information used for connection of the neighbor apparatus to the captured image;
   selecting an image corresponding to a specific neighbor apparatus to which a user desires to connect among the stored images;
   obtaining information used for connection of the specific neighbor apparatus corresponding to the selected image; and
   establishing a connection with the specific neighbor apparatus using the obtained information.

10. The method of claim 9, wherein the mapping information required for connection of the each of the at least two neighbor apparatuses to the captured image comprises mapping the information obtained during initial communication with the captured neighbor apparatus to the captured image.

11. The method of claim 9, wherein the information required for establishing the connection comprises at least one of a model name, an IDentifier (ID) and a connection address of the specific neighbor apparatus.

12. The method of claim 9, wherein the information required for establishing the connection comprises one of information used for initial communication with the specific neighbor apparatus and information regarding the specific neighbor apparatus input by a user.

13. The method of claim 9, further comprising determining if communication with the specific neighbor apparatus has been previously performed.

14. The method of claim 13, further comprising determining information required for connection with the specific neighbor apparatus and stores the determined information, if the apparatus connector determines that communication with the specific neighbor apparatus has not been previously performed.

15. The method of claim 9, wherein the communication with the specific neighbor apparatus is established using a short distance communication.

16. The method of claim 15, wherein the short distance communication comprises a peer-to-peer connection.

* * * * *